United States Patent
Deng (10) Patent No.: US 9,437,028 B2
(45) Date of Patent: Sep. 6, 2016

(54) METHOD, APPARATUS, AND TERMINAL DEVICE FOR GENERATING AND PROCESSING GESTURE AND POSITION INFORMATION

(71) Applicant: HUAWEI DEVICE CO., LTD., Shenzhen (CN)

(72) Inventor: Junjie Deng, Shenzhen (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 350 days.

(21) Appl. No.: 14/097,422

(22) Filed: Dec. 5, 2013

(65) Prior Publication Data

US 2014/0092131 A1    Apr. 3, 2014

Related U.S. Application Data

(63) Continuation of application No. PCT/CN2011/077927, filed on Aug. 2, 2011.

(51) Int. Cl.
  *G09G 5/00*    (2006.01)
  *G06T 11/60*    (2006.01)
  (Continued)

(52) U.S. Cl.
  CPC ............... *G06T 11/60* (2013.01); *G06F 3/017* (2013.01); *G06Q 20/3224* (2013.01);
  (Continued)

(58) Field of Classification Search
  CPC ................ G06F 3/017; G06F 3/0346; H04W 4/026–4/027
  USPC ........................................................ 345/629
  See application file for complete search history.

(56) References Cited

U.S. PATENT DOCUMENTS

2007/0139366 A1   6/2007 Dunko et al.
2007/0230747 A1   10/2007 Dunko
  (Continued)

FOREIGN PATENT DOCUMENTS

CN    101072378 A    11/2007
CN    101482421 A    7/2009
  (Continued)

OTHER PUBLICATIONS

Notice of Allowance mailed Jul. 23, 2015 in corresponding Korean Patent Application No. 10-2013-7030630.
  (Continued)

*Primary Examiner* — Weiming He
(74) *Attorney, Agent, or Firm* — Staas & Halsey LLP (57) ABSTRACT

Embodiments of the present invention relate to a method, an apparatus, and a terminal device for generating and processing information. The information generation method includes: generating gesture information according to an identified gesture path; detecting location information; and generating summary information according to the gesture information and the location information. The information processing method includes: receiving summary information, and extracting location information and gesture information in the summary information; and when detected current location information matches the location information obtaining a gesture path according to the gesture information in the summary information, and displaying on a viewing interface of the camera. By adopting the technical solutions provided by the present invention, a user can send gesture information when being at a certain location to a contact person, and the gesture information is displayed on a viewing interface of a camera of the contact person that arrives at the geographical location.

20 Claims, 2 Drawing Sheets

(51) Int. Cl.
  *G06F 3/01* (2006.01)
  *H04W 4/00* (2009.01)
  *H04W 4/02* (2009.01)
  *H04M 1/725* (2006.01)
  *G06Q 20/32* (2012.01)

(52) U.S. Cl.
  CPC ....... *H04M 1/72555* (2013.01); *H04W 4/001* (2013.01); *H04W 4/02* (2013.01); *H04W 4/027* (2013.01); *H04M 2250/10* (2013.01); *H04M 2250/12* (2013.01); *H04M 2250/52* (2013.01)

(56) References Cited

U.S. PATENT DOCUMENTS

| 2010/0248700 | A1* | 9/2010 | Endou ................. H04L 12/5895 455/414.1 |
| 2011/0006977 | A1 | 1/2011 | Khosravy et al. |
| 2011/0136511 | A1 | 6/2011 | Patoskie et al. |

FOREIGN PATENT DOCUMENTS

| CN | 101882010 A | 11/2010 |
| CN | 101887348 A | 11/2010 |
| EP | 0 660 131 A1 | 6/1995 |
| KR | 10-2012-0088800 | 8/2012 |
| KR | 10-2012-0111592 | 10/2012 |
| WO | 2011/004608 A1 | 1/2011 |
| WO | 2011/038018 A1 | 3/2011 |

OTHER PUBLICATIONS

Korean Office Action dated Jan. 26, 2015 in corresponding Korean Patent Application No. 10-2013-7030630.
Japanese Office Action mailed Feb. 24, 2015 in corresponding Japanese Patent Application No. 2014-513880.
International Search Report issued May 10, 2012, in corresponding International Patent Application No. PCT/CN2011/077927.
Chinese Office Action issued Aug. 31, 2012, in corresponding Chinese Patent Application No. 201180001486.5.
Extended European Search report issued on Jul. 23, 2014 in corresponding European Patent Application No. 11 795 205.1.

* cited by examiner

METHOD, APPARATUS, AND TERMINAL DEVICE FOR GENERATING AND PROCESSING GESTURE AND POSITION INFORMATION

CROSS-REFERENCE TO RELATED APPLICATIONS

This application is a continuation of International Application No. PCT/CN2011/077927, filed on Aug. 2, 2011, which is hereby incorporated by reference in its entirety.

TECHNICAL FIELD

The present invention relates to the field of communications technologies, and in particular, to a method, an apparatus, and a terminal device for generating and processing information.

BACKGROUND

At present, with rapid development of communications technologies, the number of mobile phone users also increases. During use processes of mobile phones, not only communications demands of users can be met, and meanwhile, mobile phones can also provide users a plurality of common application programs, such as an alarm clock, photographing, and a calendar, and so on.

Generally, a mobile phone user may deliver, by means of a call, a short message, and a multimedia message, information to another user, and the another user may obtain, by means of a received text, picture, or sound, the information delivered by the another user. For example, a terminal user may use a camera to shoot a scenery, and send the shot scenery to another user. If the terminal user wants to leave a self-defined symbol in the shot scenery, the terminal user needs to use picture editing software to open a shot picture, and then leave the self-defined symbol in the picture, save the modified picture, and at last, send the modified picture to the another user.

During the implementation of the present invention, the inventor discovers that, in the prior art, a problem that an operation for delivering a pattern with self-defined information between terminals is complex and time-consuming exists.

SUMMARY

An objective of the present invention is to provide a method, an apparatus, and a terminal device for generating and processing information, so that a user can send gesture information to a contact person when being at a certain geographical location, and the gesture information is displayed on a viewing interface of a camera of the contact person who arrives at the geographical location, to make an operation for delivering a pattern with self-defined information between the user and the contact person simple and time-saving.

Specific technical solutions of embodiments of the present invention are as follows:

In one aspect, an embodiment of the present invention provides an information generation method, including:

generating gesture information according to an identified gesture path, where the gesture path is formed by a movement track of a terminal;

detecting location information of a place where the gesture occurs; and generating summary information according to the gesture information and the location information.

In one aspect, an embodiment of the present invention further provides an information generation apparatus, including:

a gesture information generation module, configured to generate gesture information according to an identified gesture path, where the gesture path is formed by a movement track of a terminal;

a locator module, configured to detect location information of a place where the gesture occurs; and a summary information generation module, configured to generate summary information according to the gesture information and the location information.

In another aspect, an embodiment of the present invention provides an information processing method, including:

receiving summary information, and extracting location information and gesture information in the received summary information, where the summary information includes the gesture information generated by a sending end according to an identified gesture path and the location information of a place where the gesture occurs recorded by the sending end; and when detecting that current location information of a terminal matches the location information in the summary information, and a camera is in a switched-on state, obtaining the gesture path according to the gesture information in the summary information, and displaying on a viewing interface of the camera.

In another aspect, an embodiment of the present invention further provides an information processing apparatus, including:

a receiving processing module, configured to receive summary information, and extract location information and gesture information in the received summary information, where the summary information includes the gesture information generated by a sending end according to an identified gesture path and the location information of a place where the gesture occurs recorded by the sending end;

a locator module, configured to detect current location information of a terminal;

a monitoring processing module, configured to determine whether the current location information of the terminal matches the extracted location information in the summary information; and an image processing module, configured to: when it is detected that current location information of the terminal matches the location information in the summary information, and a camera is in a switched-on state, obtain the gesture path according to the gesture information in the summary information, and display on a viewing interface of the camera.

It may be seen from the foregoing technical solutions provided by the embodiments of the present invention that, the method and the apparatus for generating information provided by the present invention enable a user to generate self-defined gesture information directly by using a movement track of a terminal in a scenery that the user wants to shoot, instead of implementation by means of picture editing software, thereby reducing the complexity of generating gesture information. Moreover, in the method and the apparatus for processing information provided by the present invention, a receiving end receives summary information containing gesture information and location information, and when a current location matches the location information in the summary information, a self-defined image left by a user that sends the summary information can be seen on a viewing interface of a switched-on camera, so that the user can implement, by using the image, a corresponding operation that meets a demand of the user.

DESCRIPTION OF EMBODIMENTS

In a method, an apparatus, and a terminal device for generating and processing information according to the present invention, gesture information is generated according to an identified gesture path, location information of a place where the gesture occurs is recorded, and summary information containing the generated information and the location information of the place where the gesture occurs is sent to a receiving end, so that a user can generate self-defined gesture information directly by using a movement track of a terminal, instead of implementation by means of picture editing software, thereby reducing the complexity of generating gesture information. When the receiving end that receives the summary information arrives at the place where the gesture occurs, a self-defined image left by the user that sends the summary information can be seen on a viewing interface of a camera, so that the user can use the image according to a demand of the user, for example, shoot a picture with the self-defined image, perform navigation according to the image, or make an advertisement by using the image, and so on.

For better understanding of technical solutions of the present invention, the following describes the technical solutions of the present invention with reference to accompanying drawings and embodiments.

Figure 1:
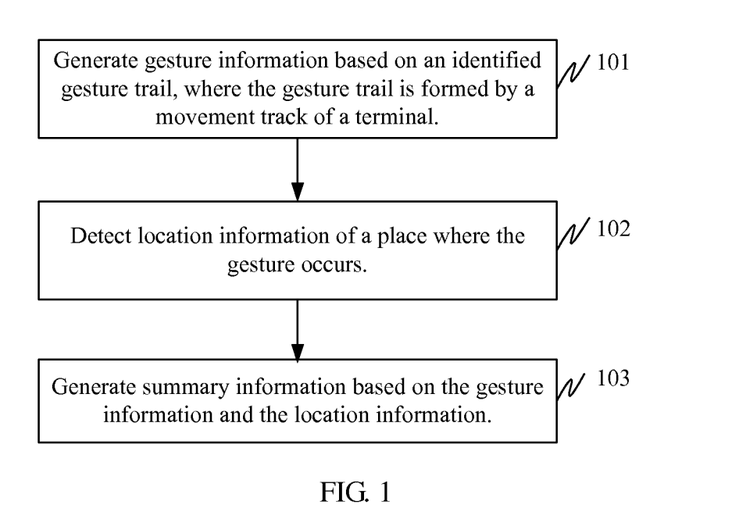
FIG. 1 is a flowchart of an information generation method according to an embodiment of the present invention.

As shown in FIG. 1, an embodiment of the present invention provides an information generation method, where the technical solution includes the following.

101: Generate gesture information according to an identified gesture path, where the gesture path is formed by a movement track of a terminal.

102. Detect location information of a place where the gesture occurs.

103. Generate summary information according to the gesture information and the location information.

In an optional embodiment of the present invention, when the gesture information is generated according to the identified gesture path in step 101, the gesture path may be identified by using an acceleration sensor, and the gesture information is generated according to the identified gesture path, where the gesture path includes any one or more of patterns, symbols, numbers, and texts.

A specific technical solution of identifying the gesture path by using the acceleration sensor is the prior art in the field. For an implementation principle, reference may be made to a touchscreen handwriting chirography system in the prior art. The present invention does not describe solutions of the prior art in detail.

In an optional embodiment of the present invention, before identifying the gesture path in step 101, the method may further include the following step:

100. Establish a model of a brush, and set attributes of the brush, where the attributes include the color, brightness, and thickness of the brush.

By setting the brush attributes, an image formed by the gesture path may be more distinct, meeting user personalized demands on color, brightness, and brush thickness.

After the brush attributes are set, the generating gesture information according to an identified gesture path includes: applying the set brush attributes to the identified gesture path, and generating the gesture information.

Optionally, the generation information generated according to the gesture path is uploaded to a network album, and a network link storing the gesture information is generated.

Furthermore, optionally, if the brush attributes are set before identifying the gesture path, the brush attributes, such as color, brightness, and thickness parameters, are loaded to the gesture information generated by the gesture path, the gesture information is uploaded to the network album, and the network link is generated.

In an optional embodiment of the present invention, the detecting location information of a place where the gesture occurs in step 102 includes:

detecting latitude and longitude coordinates of the place where the gesture occurs by using a global positioning system.

Optionally, the detecting location information of a place where the gesture occurs in step 102 further includes: detecting a direction of a terminal when the gesture occurs by using a compass or a gyroscope.

Furthermore, optionally, the detecting location information of a place where the gesture occurs in step 102 further includes:

capturing a location screenshot of the place where the gesture occurs on a network map.

Specifically speaking, in the embodiment of the present invention, it may be selectively determined whether the location information includes the location screenshot; and when it is determined that the location information includes the location screenshot, the location screenshot may be carried in the location information in a picture manner, and may also be carried in the location information in a network link format. The embodiment of the present invention does not limit the manner of carrying the location screenshot. It should be noted that, a user may preliminarily determine, according to the location screenshot, a general place of an information sending party when the sending party sends information according to, so that the user finds out the general place conveniently according to geographical knowledge already mastered by the user, and then, with the assistance of the global positioning system, finds out an accurate location.

In addition, a user that generates the summary information may shoot a background of the place where the gesture occurs as a part in the summary information, and an information recipient may determine a geographical location and the direction of a terminal when the gesture occurs according to the background picture.

Moreover, in the embodiment of the present invention, latitude and longitude coordinates and the direction of a terminal when the gesture occurs may be expressed by using a format of a simple number or letter.

In an optional embodiment of the present invention, the generating summary information according to the gesture information and the location information in step 103 includes the following:

The summary information is information that may be transmitted between terminal devices, for example, may be a short message or a multimedia message. It should be noted that, a user is allowed to modify the generated summary information. For example, a content may be added, modified, or deleted in the generated summary information.

It should be noted that, the latitude and longitude of a place where a gesture occurs and the direction of a terminal when the gesture occurs are used when the terminal determines internally, and a user needs to, with the assistance of another tool, utilize the information. Therefore, the latitude and longitude coordinates and the direction of the terminal when the gesture occurs in the summary information may be concealed.

In addition, it should be noted that, to facilitate an actual operation of a user, a button may be set on a terminal, which is used for starting gesture identification. The button may be a button on a user interface, or may be an actually existing button physically.

Figure 2:
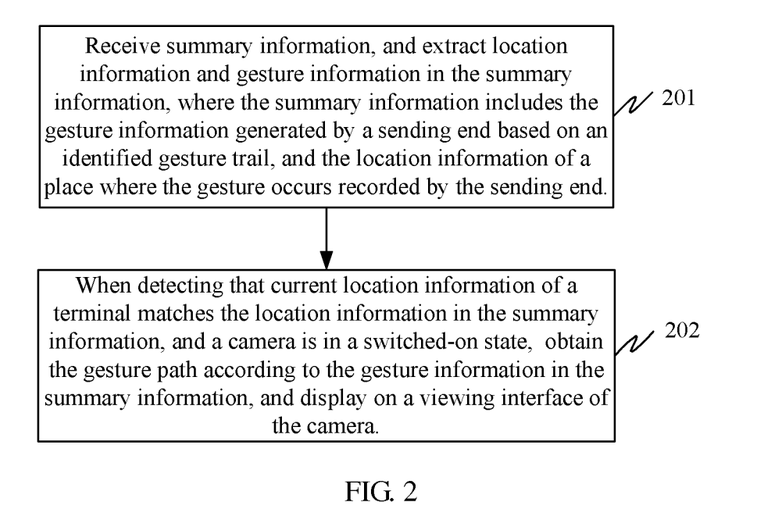
FIG. 2 is a flowchart of an information processing method according to an embodiment of the present invention.

As shown in FIG. 2, an embodiment of the present invention provides an information processing method, mainly recording a specific process of processing summary information by a terminal that receives the summary information, where the technical solution includes the following:

201. Receive summary information, and extract location information and gesture information in the received summary information, where the summary information includes the gesture information generated by a sending end according to an identified gesture path and the location information of a place where the gesture occurs recorded by the sending end.

202. When detecting that current location information of a terminal matches the location information in the summary information, and a camera is in a switched-on state, obtain the gesture path according to the gesture information in the summary information, and display on a viewing interface of the camera.

It should be noted that, description of summary information is already described in detail in Embodiment, which is not described herein again.

In an optional embodiment of the present invention, the method may also include:

after receiving the summary information, prompting to start a global positioning system; and when the global positioning system is started, detecting latitude and longitude coordinates of the current location of the terminal by using the global positioning system.

Specifically speaking, when it is determined that the summary information is received, the global positioning system may be automatically started, or a user may be prompted to start the global positioning system. In this case, the user may select, according to a demand of the user, whether to start according to. If the user selects not to start, what time the user is again prompted to start may also be set according to a user choice.

Optionally, when the global positioning system is started, a direction of the current location of the terminal may be detected by using a compass or a gyroscope.

In the embodiment of the present invention, when the user starts the global positioning system, the obtaining, according to the gesture information, an image formed by the gesture path in step 202 includes:

when the latitude and longitude coordinates of the current location match the latitude and longitude coordinates in the summary information, prompting to start the camera; and after the camera is started, extracting the gesture information generated according to the gesture path from the summary information, where the gesture path includes any one or more of patterns, symbols, numbers, and texts.

Optionally, the gesture information in the embodiment of the present invention may be carried in the summary information in a network link format.

Furthermore, optionally, before identifying the gesture path, if brush attributes are set, the received gesture information is generated by loading the set brush attributes to the gesture path. By setting the brush attributes, an image formed by the gesture path may be more distinct, meeting user personalized demands on color, brightness, and brush thickness.

In another embodiment of the present invention, when a user selects not to start a global positioning system, the method further includes the following:

The location information may further include a location screenshot of a place where a gesture occurs captured on a network map.

When the global positioning system is not started, a user may preliminarily determine a general place of a summary information sending party when the sending party sends information according to the location screenshot, so that the user finds out the general place conveniently according to geographical knowledge already mastered by the user, and then, with the assistance of the global positioning system, finds out an accurate location.

Optionally, the location information may further include a background when the summary information sending party shoots the gesture, so that after finding out the general location of the place where the gesture occurs, the user finds out, with the assistance of the background, an accurate location of the place where the gesture occurs and the direction of the terminal when the gesture occurs.

In an optional embodiment of the present invention, the obtaining, according to the gesture information, an image formed by the gesture in step 202 includes:

starting the global positioning system, and when a current location matches the location information in the summary information, prompting the user to switch on a camera; and after the camera is switched on, extracting the gesture information generated according to the gesture path from the summary information, where the gesture path includes any one or more of patterns, symbols, numbers, and texts.

Moreover, in the embodiment of the present invention, latitude and longitude coordinates and the direction of a terminal when the gesture occurs may be expressed by using a format of a simple number or letter.

It may be seen from the foregoing technical solution that, a user that receives summary information, when a current location of the user matches location information in the summary information, can see gesture information left by a summary information sending party through a viewing interface of a camera. Not only an image may be displayed in a shot picture, but also, as a path guide or a prompting means related to a geographical location, for a merchant, the image may be used as a new format of adding advertisement information.

To more clearly describe the technical solutions of the information generation method shown in FIG. 1 and the information processing method described in FIG. 2, the following adopts an application example for description.

In the application example of the present invention, summary information is sent in a multimedia message format. It is assumed that a terminal A serves as a multimedia message sending end, and a terminal B serves as a multimedia message receiving end. The technical solution of an embodiment of the present invention is as follows:

(1) A user of the terminal A arrives at the Diwang Mansion, facing the Diwang Mansion.

(2) After starting a mobile phone, the user of the terminal A sets brush attributes in a set brush model, where the brush model is implemented by setting the brush attributes, and the attributes include the color, brightness, and thickness of a brush.

(3) The user of the terminal A uses the mobile phone to draw a "smiling face" in the air.

(4) By using an acceleration sensor, identify a gesture path of the "smiling face", where the gesture path may include any one or more of patterns, symbols, numbers, and texts.

(5) Apply the set brush attribute parameters to an image formed by the gesture path, upload the image to a network album, and generate a network link.

(6) Detect location information of a place where the gesture occurs, where, specifically, latitude and longitude coordinates of the place where the gesture occurs are detected by using a global positioning system.

Optionally, a direction of the terminal when the gesture occurs is detected by using a compass or a gyroscope.

Optionally, a location screenshot of the place where the gesture occurs is captured on a network map.

Optionally, a shot background when the gesture occurs.

(7) Generate a multimedia message, where the multimedia message may include the location screenshot, the latitude and longitude coordinates of the place where the gesture occurs, the direction of the terminal when the gesture occurs, and the network link; and send the multimedia message to the terminal B.

The location screenshot and the network link are displayed in the multimedia message, and the latitude and longitude coordinates and the direction are concealed.

(8) The terminal B detects whether it receives the multimedia message, where the multimedia message includes gesture information generated by the sending end according to the identified gesture path, and the location information of the place where the gesture occurs recorded by the sending end; and after receiving the multimedia message, the terminal B prompts to start the global positioning system.

(9) When the terminal B selects not to start the global positioning system, the terminal B arrives at the Diwang Mansion with reference to the location screenshot displayed in the multimedia message, and then selects to start the global positioning system, and obtains a current location of the user in real time by using the global positioning system.

(10) After the global positioning system of the terminal B is started, detect the direction of the current location of the terminal by using a compass or a gyroscope.

(11) When the latitude and longitude coordinates detected by the terminal B is consistent with the latitude and longitude coordinates in summary information, and the detected direction of the current location is consistent with the direction in the summary information, prompt a user of the terminal B to switch on a camera.

(12) According to the gesture information in the multimedia message, download the "smiling face" formed by the sending end according to the identified gesture path from the network album, where the gesture information is the network link generated after the image is uploaded to the network album, where the gesture path includes any one or more of patterns, symbols, numbers, and texts.

(13) Display the smiling face on a viewing interface of the camera of the terminal B.

Figure 3:
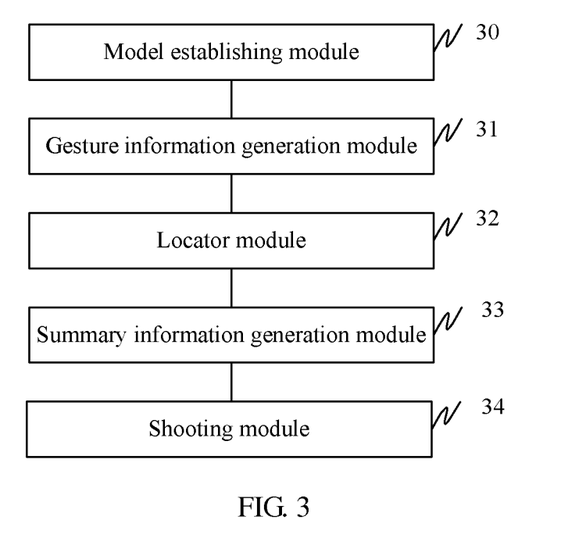
FIG. 3 is a structure schematic diagram of an information generation apparatus according to an embodiment of the present invention.

As shown in FIG. 3, an embodiment of the present invention provides an information generation apparatus, including:

a gesture information generation module 31, configured to generate gesture information according to an identified gesture path, where the gesture path is formed by a movement track of a terminal;

a locator module 32, configured to detect location information of a place where the gesture occurs; and a summary information generation module 33, configured to generate summary information according to the gesture information and the location information.

In an optional embodiment of the present invention, the gesture information generation module 31 may be specifically configured to:

identify the gesture path by using an acceleration sensor, and generate the gesture information according to the identified gesture path, where the gesture path includes any one or more of patterns, symbols, numbers, and texts.

In an optional embodiment of the present invention, the locator module 32 may include:

a global positioning unit, configured to detect latitude and longitude coordinates of the place where the gesture occurs.

Optionally, the locator module 32 may also include: a direction detection unit, configured to detect a direction of the terminal when the gesture occurs by using a compass or a gyroscope; and/or, a location capturing unit, configured to capture a location screenshot of the place where the gesture occurs on a network map.

In an optional embodiment of the present invention, the apparatus further includes: a shooting module 34, configured to shoot a background when the gesture occurs.

In an optional embodiment of the present invention, the apparatus further includes:

a model establishing module 30, configured to: before identifying the gesture path, establish a model of a brush, and set attributes of the brush, where the attributes include the color, brightness, and thickness of the brush.

The gesture information generation module is further configured to: apply the set brush attributes to the identified gesture path, and generate the gesture information.

It should be noted that, the information generation apparatus according to the embodiment of the present invention is obtained based on the technical solution of the information generation method in the embodiment in FIG. 1, containing technical features being the same as or corresponding to the embodiment in FIG. 1. Therefore, for a specific technical solution in the embodiment of the present invention, reference may be made to related description in the embodiment in FIG. 1, which is not described herein again.

Figure 4:
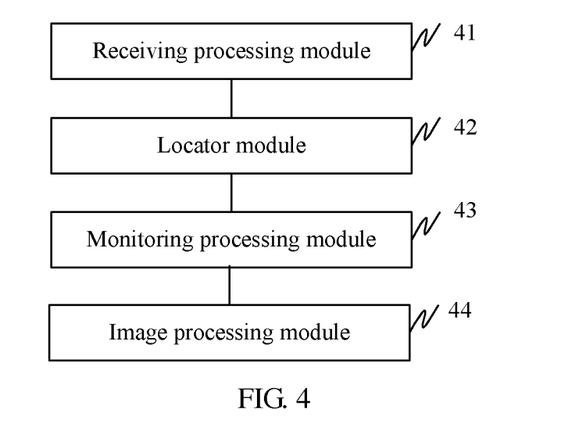
FIG. 4 is a structure schematic diagram of an information processing apparatus according to an embodiment of the present invention.

As shown in FIG. 4, an embodiment of the present invention provides an information processing apparatus, including:

a receiving processing module 41, configured to receive summary information, and extract location information and gesture information in the received summary information, where the summary information includes the gesture information generated by a sending end according to an identified gesture path and the location information of a place where the gesture occurs recorded by the sending end;

a locator module 42, configured to detect current location information of a terminal;

a monitoring processing module 43, configured to determine whether the current location information of the terminal matches the extracted location information in the summary information; and an image processing module 44, configured to: when it is detected that current location information of the terminal matches the location information in the summary information, and a camera is in a switched-on state, obtain the gesture path according to the gesture information in the summary information, and display on a viewing interface of the camera.

In an optional embodiment of the present invention, the receiving processing module 41 is further configured to: after receiving the summary information, prompt to start a global positioning system.

The locator module 42 includes a global positioning unit, configured to: when the global positioning system is started, detect latitude and longitude coordinates of the current location of the terminal by using the global positioning system.

Optionally, the locator module 42 further includes a direction detection unit, configured to: when the global positioning system is started, detect a direction of the current location of the terminal by using a compass or a gyroscope.

In an optional embodiment of the present invention, after the current location of the terminal matches the location information in the summary information, the monitoring processing module 43 is further configured to prompt to switch on the camera.

It should be noted that, the information processing apparatus according to the embodiment of the present invention is provided based on the technical solution of the information processing method in the embodiment in FIG. 2, containing technical features being the same as or corresponding to the embodiment in FIG. 2. Therefore, for a specific technical solution in the embodiment of the present invention, reference may be made to related description in the embodiment in FIG. 2, which is not described herein again.

Figure 5:
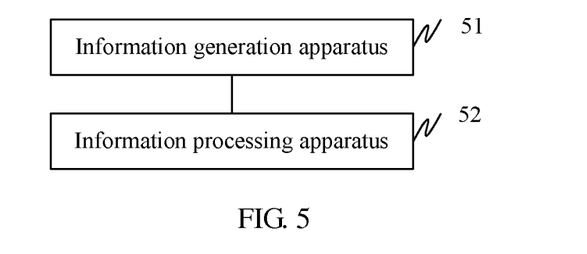
FIG. 5 is a structure schematic diagram of a terminal device according to an embodiment of the present invention.

As shown in FIG. 5, an embodiment of the present invention provides a terminal device, including:

the information generation apparatus 51 according to the embodiment in FIG. 3, configured to generate gesture information according to a gesture path, detect location information of a place where the gesture occurs, generate summary information according to the gesture information and the location information, and send the summary information to a receiving end; where the information generation apparatus includes:

a gesture information generation module, configured to generate the gesture information according to an identified gesture path, where the gesture path is formed by a movement track of a terminal;

a locator module, configured to detect the location information of the place where the gesture occurs; and a summary information generation module, configured to generate the summary information according to the gesture information and the location information; and the information processing apparatus 52 according to the embodiment in FIG. 4, configured to receive the summary information, when a current location matches the location information, and a camera is in a switched-on state, obtain, according to the gesture information, an image formed by the gesture path, and display the image on a viewing interface of the camera; where the information processing apparatus includes:

a receiving processing module, configured to receive the summary information, and extract the location information and the gesture information in the received summary information, where the summary information includes the gesture information generated by a sending end according to the identified gesture path and the location information of the place where the gesture occurs recorded by the sending end;

a locator module, configured to detect the current location information of the terminal;

a monitoring processing module, configured to determine whether the current location information of the terminal matches the extracted location information in the summary information; and an image processing module, configured to match the detected current location information of the terminal with the location information in the summary information, and when the camera is in a switched-on state, obtain the gesture path according to the gesture information in the summary information, and display on the viewing interface of the camera.

It should be noted that, in an actual application, the information generation apparatus and the information processing apparatus may, together, be set on a terminal device. When a user that uses the terminal device serves as a sending end of summary information, the summary information is generated by using the information generation apparatus, and the summary information is sent to a receiving end; and when a user that uses the terminal device serves as a receiving end of summary information, the summary information is obtained by using the information processing apparatus, and when a current location matches location information in the summary information, obtained gesture information is displayed on a viewing interface. It should be noted that, if the information generation apparatus and the information processing apparatus together exist on a device, the locator modules are a same module.

The implementation of a method and an apparatus for generating information according to the embodiments of the present invention enables a user to generate self-defined gesture information directly by using a movement track of a terminal, instead of implementation by means of picture editing software, thereby reducing the complexity of generating gesture information.

In the implementation of a method and an apparatus for processing information according to the embodiments of the present invention, when a receiving end that receives summary information arrives at a place where a gesture occurs, a self-defined image left by a user that sends the summary information can be seen on a viewing interface of a camera, so that the user can use the image according to a demand of the user, for example, shoot a picture with the self-defined image, perform navigation according to the image, or make an advertisement by using the image, and so on.

A person of ordinary skill in the art may understand that all or a part of the processes of the methods in the embodiments may be implemented by a program instructing relevant hardware. The program may be stored in a computer readable storage medium. When the program is run, the processes of the embodiments of the methods may be performed. The storage medium may be a magnetic disk, an optical disk, a read-only memory (Read-Only Memory, ROM), or a random access memory (Random Access Memory, RAM).

What is claimed is:

1. An information generation method, comprising:
generating, by at least one hardware processor, gesture information according to an identified gesture path, wherein the gesture path is formed by a movement track of a terminal;
detecting, by the at least one hardware processor, location information of a place where the gesture occurs;
generating, by the at least one hardware processor, summary information according to the gesture information and the location information; and
sending the summary information to a camera of a contact person, so that upon arrival at a geographical location corresponding to the place where the gesture occurred, the gesture information can be displayed on the camera.

2. The method according to claim 1, wherein the generating gesture information according to an identified gesture path comprises:
identifying the gesture path by using an acceleration sensor, and generating the gesture information according to the identified gesture path, wherein the gesture path comprises any one or more of patterns, symbols, numbers, and texts.

3. The method according to claim 1, wherein the location information comprises:
latitude and longitude coordinates of the place where the gesture occurs detected by using a global positioning system.

4. The method according to claim 3, wherein the location information further comprises: a direction of a terminal when the gesture occurs detected by using a compass or a gyroscope by using a compass or a gyroscope; and/or,
a location screenshot of the place where the gesture occurs captured on a network map.

5. The method according to claim 3, wherein the location information further comprises: a shot background when the gesture occurs.

6. The method according to claim 1, wherein, before recording the gesture path, the method further comprises: establishing a model of a brush, and setting attributes of the brush, wherein the attributes comprise the color, brightness, and thickness of the brush; and
the generating gesture information according to an identified gesture path comprises: applying by the at least one hardware processor, the set brush attributes to the identified gesture path, and generating by the at least one hardware processor, the gesture information.

7. An information generation apparatus, comprising:
at least one hardware processor;
a memory interfaced to the at least one hardware processor, the memory including instructions which control the at least one hardware processor to implement:
a gesture information generation module, configured to generate gesture information according to an identified gesture path, wherein the gesture path is formed by a movement track of a terminal;
a locator module, configured to detect location information of a place where the gesture occurs; and
a summary information generation module, configured to generate summary information according to the gesture information and the location information, and to send the summary information to a camera of a contact person, so that upon arrival at a geographical location corresponding to the place where the gesture occurred, the gesture information can be displayed on the camera.

8. The apparatus according to claim 7, wherein the gesture information generation module is specifically configured to:
identify the gesture path by using an acceleration sensor; and
generate the gesture information according to the identified gesture path;
wherein the gesture path comprises any one or more of patterns, symbols, numbers, and texts.

9. The apparatus according to claim 7, wherein the at least one hardware processor further implements a global positioning unit, configured to detect latitude and longitude coordinates of the place where the gesture occurs.

10. The apparatus according to claim 9, wherein the locator module further comprises: a direction detection unit, configured to detect a direction of a terminal when the gesture occurs by using a compass or a gyroscope; and/or,
a location capturing unit, configured to capture a location screenshot of the place where the gesture occurs on a network map.

11. The apparatus according to claim 9, wherein the at least one hardware processor further implements a shooting module, configured to shoot a background when the gesture occurs.

12. The apparatus according to claim 7, wherein the at least one hardware processor further implements:
a model establishing module, configured to before identifying the gesture path, establish a model of a brush, and set attributes of the brush;
wherein:
the attributes comprise the color, brightness, and thickness of the brush; and
the gesture information generation module is further configured to apply the set brush attributes to the identified gesture path, and generate the gesture information.

13. An information processing method, comprising:
receiving summary information, and extracting location information and gesture information in the received summary information, wherein the summary information comprises the gesture information generated by a sending end according to an identified gesture path and the location information of a place where the gesture occurs recorded by the sending end; and
when detecting that current location information of a terminal matches the location information in the summary information, and a camera is in a switched-on state, obtaining the gesture path according to the gesture information in the summary information, and displaying the gesture information according to the gesture path on a viewing interface of the camera.

14. The processing method according to claim 13, wherein the method further comprises:
after receiving the summary information, prompting to start a global positioning system; and
when the global positioning system is started, detecting latitude and longitude coordinates of the current location of the terminal by using the global positioning system.

15. The processing method according to claim 14, wherein the method further comprises:
when the global positioning system is started detecting a direction of the current location of the terminal by using a compass or a gyroscope.

16. The processing method according to claim 13, wherein, after the current location information of a terminal matches the location information in the summary information, the method further comprises:
prompting to switch on the camera.

17. An information processing apparatus, comprising:
at least one hardware processor;
a memory interfaced to the at least one hardware processor, the memory including instructions which control the at least one hardware processor to implement:
   a receiving processing module, configured to receive summary information, and extract location information and gesture information in the received summary information, wherein the summary information comprises the gesture information generated by a sending end according to an identified gesture path and the location information of a place where the gesture occurs recorded by the sending end;
   a locator module, configured to detect current location information of a terminal;
   a monitoring processing module, configured to determine whether the current location information of the terminal matches the extracted location information in the summary information; and
   an image processing module, configured to: when it is detected that current location information of the terminal matches the location information in the summary information, and a camera is in a switched-on state, obtain the gesture path according to the gesture information in the summary information, and display the gesture information according to the gesture path on a viewing interface of the camera.

18. The processing apparatus according to claim 17, wherein
   the receiving processing module is further configured to: after the summary information is received, prompt to start a global positioning system; and
   the locator module comprises a global positioning unit, which is configured to: when the global positioning system is started, detect latitude and longitude coordinates of the current location of the terminal by using the global positioning system.

19. The processing apparatus according to claim 18, wherein the locator module further comprises a direction detection unit, configured to: when the global positioning system is started, detect a direction of the current location of the terminal by using a compass or a gyroscope.

20. The processing apparatus according to claim 17, wherein, after the current location of the terminal matches the location information in the summary information, the monitoring processing module is further configured to: prompt to switch on the camera.

* * * * *